United States Patent
Moulton et al.

(10) Patent No.: US 9,485,154 B2
(45) Date of Patent: Nov. 1, 2016

(54) MULTIPLE-PIPE TECHNIQUES AND MULTIPLE OPTICAL STREAMS FOR MANAGING OVER-THE-TOP TRAFFIC

(71) Applicant: Ciena Corporation, Hanover, MD (US)

(72) Inventors: Wayne Geoffrey Moulton, Brighton (AU); Karl Christopher Horne, Mid-Levels (HK)

(73) Assignee: Ciena Corporation, Hanover, MD (US)

( * ) Notice: Subject to any disclaimer, the term of this patent is extended or adjusted under 35 U.S.C. 154(b) by 341 days.

(21) Appl. No.: 14/160,287

(22) Filed: Jan. 21, 2014

(65) Prior Publication Data

US 2015/0003831 A1     Jan. 1, 2015

Related U.S. Application Data

(60) Provisional application No. 61/839,678, filed on Jun. 26, 2013.

(51) Int. Cl.

| | |
|---|---|
| *H04L 12/26* | (2006.01) |
| *H04L 12/28* | (2006.01) |
| *H04L 12/24* | (2006.01) |
| *H04L 12/851* | (2013.01) |
| *H04L 12/927* | (2013.01) |
| *H04L 12/14* | (2006.01) |
| *H04L 12/813* | (2013.01) |

(52) U.S. Cl.
CPC ......... *H04L 41/5054* (2013.01); *H04L 12/145* (2013.01); *H04L 41/5019* (2013.01); *H04L 41/5064* (2013.01); *H04L 41/5067* (2013.01); *H04L 47/2441* (2013.01); *H04L 47/805* (2013.01); *H04L 47/20* (2013.01)

(58) Field of Classification Search
CPC .......................... H04L 12/145; H04L 47/20
USPC ........................................................ 370/252
See application file for complete search history.

(56) References Cited

U.S. PATENT DOCUMENTS

| | | | | |
|---|---|---|---|---|
| 6,775,280 | B1* | 8/2004 | Ma ......................... | H04L 45/00 370/230 |
| 7,433,943 | B1* | 10/2008 | Ford .................... | H04L 12/5695 370/235 |
| 8,111,697 | B1* | 2/2012 | Panwar ................... | H04L 49/00 370/389 |
| 8,489,720 | B1* | 7/2013 | Morford ............. | H04L 41/0896 709/223 |
| 2003/0063348 | A1* | 4/2003 | Posey, Jr. ................ | H04L 45/00 398/49 |
| 2003/0118029 | A1* | 6/2003 | Maher, III .......... | H04L 41/5022 370/395.21 |
| 2003/0223414 | A1* | 12/2003 | Wong ..................... | H04L 47/10 370/389 |
| 2008/0090575 | A1* | 4/2008 | Barak ................... | H04W 16/10 455/444 |

(Continued)

*Primary Examiner* — Khaled Kassim
*Assistant Examiner* — Berhanu Belete
(74) *Attorney, Agent, or Firm* — Clements Bernard PLLC; Christopher L. Bernard; Lawrence A. Baratta, Jr.

(57) ABSTRACT

Methods and apparatus for managing an over-the-top data traffic flood using multiple-pipe techniques are provided. For example, provided is a method for routing Internet data including receiving the Internet data at a carrier portal, as well as classifying the Internet data based on criteria specified by the carrier, such as a quantity of payment from at least one of a user of the Internet data to a provider of the Internet data. The classified data is transmitted via one of a plurality of ports, where port selection is based on the classification. Each of the ports in the plurality of ports is coupled to a respective one of a plurality of independent data transport networks and/or separate optical paths. The data transport networks and/or separate optical paths can differ in capacity and/or latency.

20 Claims, 2 Drawing Sheets

(56) References Cited

U.S. PATENT DOCUMENTS

| | | | |
|---|---|---|---|
| 2009/0052297 A1* | 2/2009 | Ku | G02F 3/02 369/100 |
| 2011/0280143 A1* | 11/2011 | Li | H04L 12/14 370/252 |
| 2013/0165084 A1* | 6/2013 | Xu | H04W 4/003 455/414.1 |
| 2013/0166623 A1* | 6/2013 | Stanwood | H04W 4/00 709/202 |
| 2014/0130104 A1* | 5/2014 | Ruffini | H04N 21/2181 725/62 |
| 2014/0153392 A1* | 6/2014 | Gell | H04W 28/0236 370/230 |
| 2014/0155043 A1* | 6/2014 | Gell | H04W 4/003 455/414.1 |

* cited by examiner

MULTIPLE-PIPE TECHNIQUES AND MULTIPLE OPTICAL STREAMS FOR MANAGING OVER-THE-TOP TRAFFIC

CROSS-REFERENCE TO RELATED APPLICATIONS

The present Application for Patent claims the benefit of U.S. Provisional Patent Application No. 61/839,678, entitled "TWO-PIPE MODEL FOR MANAGING OVER-THE-TOP TRAFFIC," filed Jun. 26, 2013, assigned to the assignee hereof, and expressly incorporated herein by reference in its entirety.

FIELD OF DISCLOSURE

This disclosure relates generally to electronic and optical transmission, and more specifically, but not exclusively, to methods and apparatus that manage over-the-top data traffic using multiple-pipe techniques.

BACKGROUND

Conventional optical data transport methods and apparatus treat data traffic in a similar manner, and carry different types of data traffic using the same data transport path (e.g., the same "pipe"/same optical stream). Typical data transport methods and apparatus also treat users in a similar manner by providing an equal level of service in an optical layer to all customers and using data layer (e.g., Ethernet, MPLS, IP) throttling to control data flow. For example, carriers (e.g., an ISP) provide the same data transport service for a person paying twenty dollars per month and a company paying one million dollars per month. However, while revenue varies by customer, for a carrier that owns a data transport network (e.g., a metro network, a regional network, an inter-capital network, and/or an international submarine network), equipment costs are not dependent upon the type of traffic transported, traffic volume per user, revenue per user, or a type of user. Conventionally, all traffic is treated equally and without special consideration.

One type of data traffic transported by carriers is over-the-top (OTT) content. OTT content is data transported from a third party (i.e., not the carrier) to an end user via the carrier. The carrier does not control the contents of the OTT data being transported from the third party to the end user, and essentially only provides a "dumb pipe" to transport the data. In recent years, the new trend of delivering broadband audio, broadband video, voice over Internet protocol (VoIP), social networking, games, and ecommerce from the third parties, to the end users (i.e., the "OTT flood") pushes capacity constraints of conventional data transport networks because there are no limits to the quantity of data that the third party can attempt to force into a carrier's network. A disturbing effect of the OTT flood is that servicing the increase in demand for transport services exponentially increases the carrier's equipment costs, while providing essentially no increase in the carrier's revenue. From a business perspective, servicing OTT content using conventional telecommunications methods and apparatus leads carriers to financial difficulty, and provides customers with poorer quality of service, irrespective of the price paid by the customers for the service.

Accordingly, there are long-felt industry needs for methods and apparatus that improve upon conventional methods and apparatus, including the improved methods and apparatus provided hereby.

SUMMARY

This summary provides a basic understanding of some aspects of the present teachings. This summary is not exhaustive in detail, and is neither intended to identify all critical features, nor intended to limit the scope of the claims.

Exemplary methods and apparatus for communicating Internet data are provided. In an example, a method includes receiving the Internet data at a carrier portal and classifying the Internet data based on criteria, wherein the criteria is based on at least one of a quantity of payment from at least one of a user of the Internet data to a provider of the Internet data and another criteria specified by the carrier. The method also includes transmitting the classified data via one of a plurality of ports based on the classification, wherein each of the ports in the plurality of ports is coupled to a respective one of a plurality of independent data transport networks. In an example, at least one data transport network in the plurality of independent data transport networks is at least one of higher capacity and lower latency than at least one other transport network in the plurality of independent data transport networks. In another example, the independent networks in the plurality of independent data transport networks are physically separate from each other. Further, the one of the plurality of ports can be coupled to a respective one of a plurality of optical streams and/or optical fibers and/or wavelengths in an optical fiber.

In a further example, provided is a non-transitory computer-readable medium, comprising instructions stored thereon that, if executed by a processor, such as a special-purpose processor, cause the processor to execute at least a part of the aforementioned method. The non-transitory computer-readable medium can be integrated with a device, such as an edge router, an optical switch, and a network element. The non-transitory computer-readable medium can be implemented on devices effecting a centralized control mechanism based on Software Defined Network architectures, as opposed to a medium implemented on network elements directly in a data transport path, where the one of the plurality of ports is coupled to a respective one of a plurality of optical streams.

In another example, provided is an apparatus configured to communicate Internet data. The apparatus includes means for receiving the Internet data at a carrier portal and means for classifying the Internet data based on criteria, wherein the criteria is based at least one of a quantity of payment from at least one of a user of the Internet data to a provider of the Internet data and another criteria specified by the carrier. The apparatus also includes means for transmitting the classified data via one of a plurality of ports based on the classification, wherein each of the ports in the plurality of ports is coupled to a respective one of a plurality of independent data transport networks. In an example, at least one data transport network in the plurality of independent data transport networks is at least one of higher capacity and lower latency than at least one other transport network in the plurality of independent data transport networks. In another example, the independent networks in the plurality of independent data transport networks are physically separate from each other, yet will most often be physically carried over the same optical fiber. In another example, the one of the plurality of ports is coupled to a respective one of a plurality of optical streams and/or optical fibers and/or wavelengths in an optical fiber.

At least a part of the apparatus can be integrated on a semiconductor die. Further, at least a part of the apparatus (e.g., the processor) can be integrated with an edge router, an optical switch, and a network element.

In another example, provided is an apparatus configured to communicate Internet data. The apparatus includes a processor configured to receive the Internet data at a carrier portal and to classify the Internet data based on criteria, where the criteria is based on at least one of a quantity of payment from at least one of a user of the Internet data to a provider of the Internet data and another criteria specified by the carrier. The processor is also configured to transmit the classified data via one of a plurality of ports based on the classification, where each of the ports in the plurality of ports is coupled to a respective one of a plurality of independent data transport networks. The apparatus also includes a memory coupled to the processor. In an example, at least one data transport network in the plurality of independent data transport networks is at least one of higher capacity and lower latency than at least one other transport network in the plurality of independent data transport networks. In another example, the independent networks in the plurality of independent data transport networks are physically separate from each other. In another example, the one of the plurality of ports is coupled to a respective one of a plurality of optical fibers.

At least a part of the apparatus can be integrated on a semiconductor die. Further, at least a part of the apparatus (e.g., the processor) can be integrated with an edge router, an optical switch, and a network element.

The foregoing broadly outlines some of the features and technical advantages of the present teachings in order that the detailed description and drawings can be better understood. Additional features and advantages are also described in the detailed description. The conception and disclosed embodiments can be readily utilized as a basis for modifying or designing other structures for carrying out the same purposes of the present teachings. Such equivalent constructions do not depart from the technology of the teachings as set forth in the claims. The novel features that are characteristic of the teachings, together with further objects and advantages, are better understood from the detailed description and the accompanying figures. Each of the figures is provided for the purpose of illustration and description only, and does not limit the present teachings.

BRIEF DESCRIPTION OF THE DRAWINGS

The accompanying drawings are presented to describe examples of the present teachings, and are not limiting.

Figure 1:
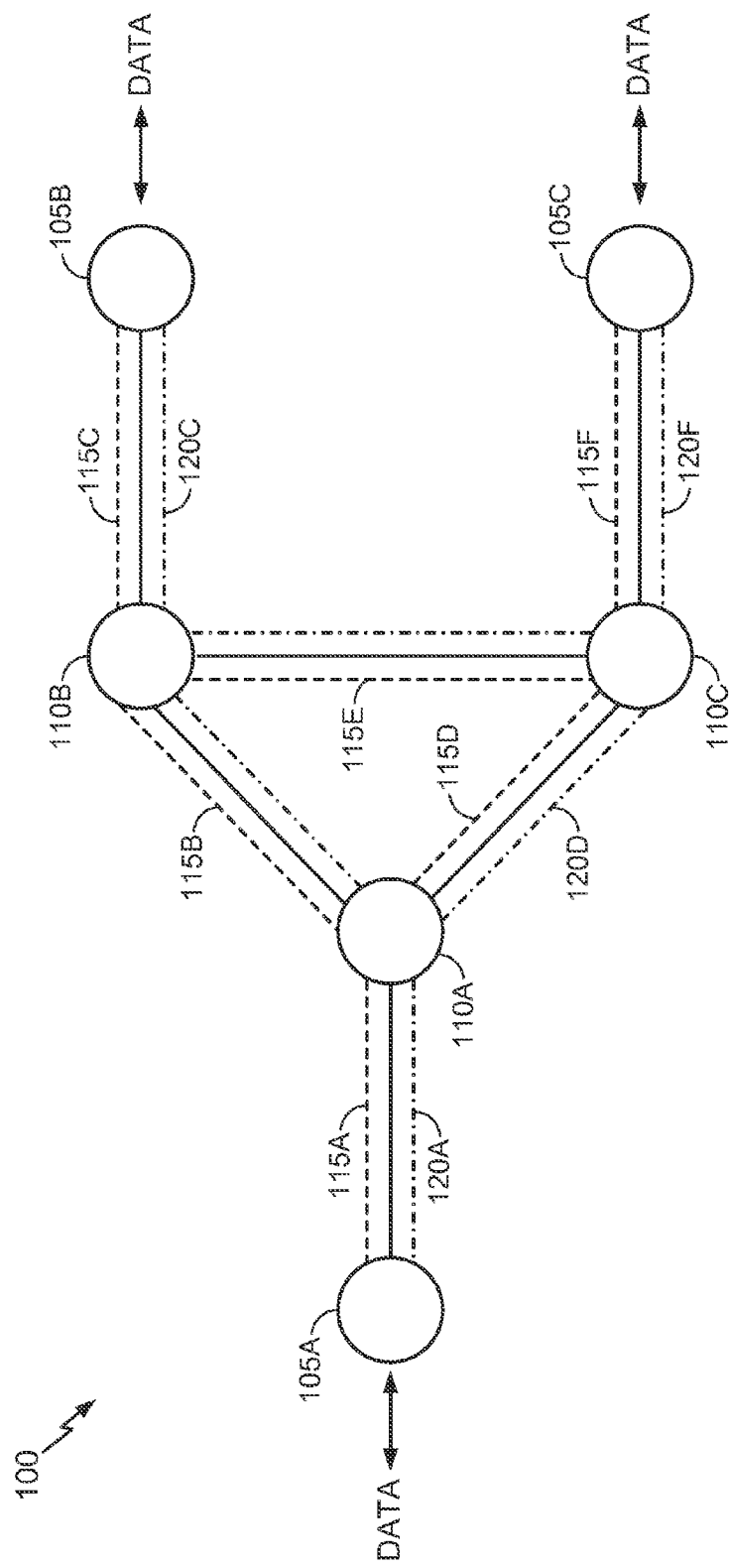
FIG. 1 depicts an exemplary data network implementing the multiple pipe/optical stream techniques.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Introduction

The examples disclosed in this application's text and drawings advantageously address the long-felt industry needs, as well as other previously unidentified needs, and mitigate shortcomings of the conventional methods and apparatus. Exemplary methods and apparatus for managing an over-the-top (OTT) data traffic flood using multiple-pipe techniques and/or multiple optical streams are provided. A data transport network implementing the multiple-pipe and/or multiple optical stream techniques transports data traffic via different, independent paths, where the path is chosen based on traffic type.

The disclosed apparatuses and methods advantageously enable a carrier to efficiently improve the carrier's revenue generating ability. The multiple pipe techniques separates treatment of traffic at the transport layer using network architecture to minimize cost of the separation. A unique attribute of the architecture is the design of the network with multiple separate transport layer network. Separating traffic into multiple separate pipes and/or multiple optical streams allows the carrier to manage the OTT flood by transporting the OTT traffic with the conventional transport network and transporting premium customer traffic via a second network. The separation allows the carrier to offer a premium service to customers from the investment in a separate pipe of an existing transport network. The multiple pipe and/or multiple optical stream techniques also enable carriers (e.g., an ISP) to contain transport of OTT traffic to within a controlled cost point and to provide paying customers with an ability to experience a premium quality service worthy of a monthly subscription. This approach enables a carrier to obtain revenue from paying customers and from OTT providers who conventionally avoid paying for use of the carrier's resources. The multiple-pipe and/or multiple optical stream techniques provides a network architecture for the carriers to manage the OTT traffic flood in a manner that allows the carrier to build a revenue source linked to a customer experience.

In an example, provided is a method for communicating Internet data. The method includes receiving the Internet data at a carrier portal, as well as classifying the Internet data based on criteria. The criteria are based on a quantity of payment from at least one of a user of the Internet data and a provider of the Internet data. Then, the classified data is transmitted via one of a plurality of ports based on the classification. Each of the ports in the plurality of ports is coupled to a respective one of a plurality of independent data transport networks. A data transport network in the plurality of independent data transport networks can be of higher capacity and/or of lower latency than at least one other transport network in the plurality of independent data transport networks.

Exemplary embodiments are disclosed in this application's text and drawings. Alternate embodiments can be devised without departing from the scope of the invention. Additionally, conventional elements of the current teachings may not be described in detail, or may be omitted, to avoid obscuring aspects of the current teachings.

As used herein, the term "exemplary" means "serving as an example, instance, or illustration." Any embodiment described as "exemplary" is not necessarily to be construed as preferred or advantageous over other embodiments. Likewise, the term "embodiments of the invention" does not require that all embodiments of the invention include the discussed feature, advantage, or mode of operation. Use of the terms "in one example," "an example," "in one feature," and/or "a feature" in this specification does not necessarily refer to the same feature and/or example. Furthermore, a particular feature and/or structure can be combined with one or more other features and/or structures.

It should be noted that the terms "connected," "coupled," or any variant thereof, mean any connection or coupling, either direct or indirect, between elements, and can encompass a presence of an intermediate element between two elements that are "connected" or "coupled" together via the intermediate element. Coupling and/or connection between the elements can be physical, logical, or a combination thereof. As employed herein, elements can be "connected" or "coupled" together, for example, by using one or more wires, cables, and/or printed electrical connections, as well as by using electromagnetic energy. The electromagnetic energy can have wavelengths in the radio frequency region, the microwave region and/or the optical (both visible and invisible) region. These are several non-limiting and non-exhaustive examples.

It should be understood that the term "signal" can include any signal such as a data signal, audio signal, video signal, multimedia signal, analog signal, and/or digital signal. Information and signals can be represented using any of a variety of different technologies and techniques. For example, data, an instruction, a process step, a command, information, a signal, a bit, and/or a symbol described in this description can be represented by a voltage, a current, an electromagnetic wave, a magnetic field and/or particle, an optical field and/or particle, and any combination thereof.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements. In addition, terminology of the form "at least one of: A, B, or C" used in the description or the claims can be interpreted as "A or B or C or any combination of these elements."

The terminology used herein is for the purpose of describing particular embodiments only and is not intended to be limiting. As used herein, the singular forms "a," "an," and "the" are intended to include the plural forms as well, unless the context clearly indicates otherwise. Further, the terms "comprises," "comprising," "includes," and "including," when used herein, specify a presence of stated features, integers, steps, operations, elements, and/or components, but do not preclude the presence and/or addition of one or more other features, integers, steps, operations, elements, components, and/or groups thereof.

In this description, certain terminology is used to describe certain features. The term "access device" can describe, and is not limited to, a network interface, a physical layer device, a router, a switch, a transceiver, an add-drop multiplexer, a transponder, and an electrical device configured to perform at least a part of a method described herein. As used herein, the tem "single pipe" can describe an existing transport network, even if the transport network is virtually separated at layers two and/or three as defined in the open source initiative (OSI) model. Further, the term "two pipe" can describe two physically separate transport systems using different fibers, where one system uses an existing transport network, and the other system uses a next generation broadband network technology (e.g., a data transport technology that is more advanced than the existing transport network's technology). The terms The Digital Capacity Transmission Service (DCTS) is an example of a type of service that can be used by the methods described herein and is a declared service under Part XIC of the Trade Practices Act (30 Jun. 1997). The DCTS is a generic symmetric transmission service used for the carriage of voice, data or other communications. The minimum bandwidth in the current declaration is 2 Mbps.

DESCRIPTION OF THE FIGURES

FIG. 1 depicts an exemplary data network 100 implementing the multiple pipe and/or multiple optical stream techniques. The network 100 includes access devices 105A-C (e.g., an edge router) coupled via core network devices 110A-C (e.g., an optical transport network (OTN) such as a dense wavelength divisional multiplexing (DWDM) OTN). In an example, the network 100 is divided into at least two distinct logical networks. For example, a first logical network includes data transport links 115A-115F (i.e., pipes). The first logical network can be dedicated to transporting traffic for users of the carrier's service who pay a first amount for service over the first logical network. The first amount can be any amount of payment equal to, or greater than, zero.

The network 100 also includes a second logical network that includes data transport links 120A-120F (i.e., pipes, new optical streams, and the like). The second logical network can be dedicated to transporting traffic for users of the carrier's service who pay a second amount for service over the second logical network, where the second amount is greater than the first amount. The second logical network could, for example, be used by a carrier to provide a premium service to paying users of the carrier's service. The first and second logical networks need not exactly topographically mirror each other.

Though the example in FIG. 1 describes a logical division between the first logical network and the second logical network, the multiple networks of the multiple pipe techniques can be differentiated and/or independent on at least one of physical layer (layer 1), data link layer (layer 2), and the network layer (layer 3) of the open system interconnection (OSI) (ISO/IEC 7498-1) model. In other words, any networks in the multiple pipe techniques can have a combination of physical hardware (layer 1) and logical (layer 2 and/or 3) division, so long as the networks in the multiple pipe techniques do not share a common data pipe.

Thus, a carrier can implement a new pipe and/or a new optical stream (e.g., a Next Generation Transport Network) to carry revenue driven traffic in parallel with the carrier's conventional transport network, and maintain the conventional transport network to serve the non-revenue generating OTT traffic. The carrier can separate the traffic at a carrier portal to separate the data traffic and communicate the separated data traffic over an appropriate pipe in the multiple pipes and/or multiple optical stream network. Further, the carrier can apply a policy engine at an access router (e.g., any of access devices 105A-C) and/or a core network device (e.g., any of core network devices 110A-C) to separate the data traffic and communicate the separated data traffic over an appropriate pipe in the multiple pipe network. The policy engine can also be applied in a network control layer as defined by Software Defined Networking architectures. For efficiency's sake, it is often, but not always, better to perform the separation as close to a data source as possible.

With the multiple pipe and/or multiple optical stream techniques, when a user pays a premium for their connection and accesses content via the carrier's portal, the paying user benefits from using the Next Generation Transport Network, whereas when the user is not accessing content through the carrier portal the non-paying user accesses content using the carrier's conventional transport network. Thus, when OTT content is accessed and no revenue is generated, the non-paying user's data is transported over the carrier's conventional transport network and not over the Next Generation Transport Network. It should be noted that using existing transport assets (i.e., optical fiber, radio, and the like) enables implementing the provided techniques. Accordingly, contention occurs in the carrier's conventional transport network, which should motivate users to pay to use the Next Generation Transport Network to avoid the effects of network contention due to the OTT flood.

Figure 2:
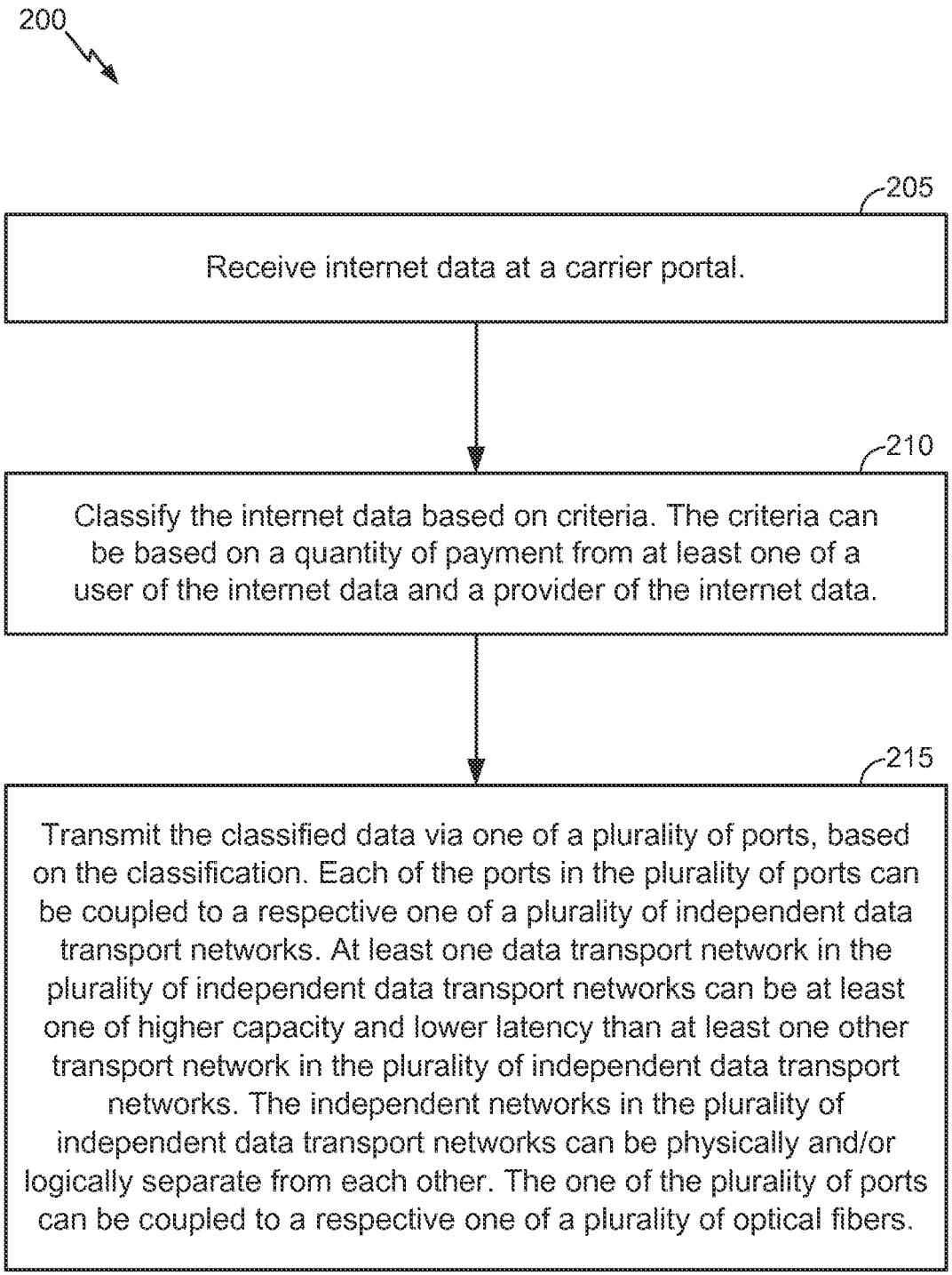
FIG. 2 depicts an exemplary method for communicating Internet data.

FIG. 2 depicts an exemplary method for communicating Internet data. At least a part of the method for communicating Internet data can be performed by at least a part of the apparatus described hereby, such as the constituent components of the network 100.

In step 205, the Internet data is received at a carrier portal.

In step 210, the Internet data is classified based on criteria. The criteria can be based on a quantity of payment from at least one of a user of the Internet data and a provider of the Internet data. The criteria do not have to be limited to only quantity of payment, but may take a form of other value metrics attributed by the carrier.

In step 215, the classified data is transmitted via one of a plurality of ports, based on the classification. Each of the ports in the plurality of ports can be coupled to a respective one of a plurality of independent data transport networks. At least one data transport network in the plurality of independent data transport networks can be at least one of higher capacity and lower latency than at least one other transport network in the plurality of independent data transport networks. The independent networks in the plurality of independent data transport networks can be physically and/or logically separate from each other. The one of the plurality of ports can be coupled to a respective one of a plurality of optical fibers.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

At least a portion of the methods, sequences and/or algorithms described in connection with the embodiments disclosed herein may be embodied directly in hardware, in a software module executed by a processor, or in a combination of the two. In an example, a processor includes multiple discrete hardware components. A software module may reside in RAM memory, flash memory, ROM memory, EPROM memory, EEPROM memory, registers, hard disk, a removable disk, a CD-ROM, and/or any other form of storage medium known in the art. An exemplary storage medium can be coupled to the processor such that the processor can read information from, and write information to, the storage medium. In an alternative, the storage medium may be integral with the processor.

Further, many embodiments are described in terms of sequences of actions to be performed by, for example, elements of a computing device. At least a part of the methods described herein can be performed by a specific circuit (e.g., an application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, a corresponding circuit of any such embodiments may be described herein as, for example, "logic configured to" perform a described action.

An embodiment of the invention can include a computer readable media embodying a method described herein. Accordingly, the invention is not limited to illustrated examples and any means for performing the functionality described herein are included in embodiments of the invention.

An embodiment of the invention can include a computer readable media separate from the network, embodying a method described herein. Specifically, this describes network architectures where policies and classifications are enforced via centralized control mechanisms as described by Software Defined Networking (SDN) architectures, where classification policy is set separate from the networking elements, but are nonetheless enforced by the networking elements under SDN control. Accordingly, the invention is not limited to illustrated examples and any means for performing the functionality described herein are included in embodiments of the invention.

The disclosed devices and methods can be designed and can be configured into a computer-executable file that is in a Graphic Database System Two (GDSII) compatible format, an Open Artwork System Interchange Standard (OASIS) compatible format, and/or a GERBER (e.g., RS-274D, RS-274X, etc.) compatible format, which are stored on a non-transitory (i.e., a non-transient) computer-readable media. The file can be provided to a fabrication handler who fabricates with a lithographic device, based on the file, an integrated device. In an example, the integrated device is on a semiconductor wafer. The semiconductor wafer can be cut into a semiconductor die and packaged into a semiconductor chip. The semiconductor chip can be employed in a device described herein (e.g., an access device).

Embodiments can include a non-transitory (i.e., a non-transient) machine-readable media and/or a non-transitory (i.e., a non-transient) computer-readable media embodying instructions which, when executed by a processor, transform a processor and any other cooperating devices into a machine configured to perform at least a part of a function described hereby and/or transform a processor and any other cooperating devices into at least a part of the apparatus described hereby.

Nothing stated or illustrated herein is intended to cause a dedication of any component, step, feature, object, benefit, advantage, or equivalent to the public, regardless of whether the component, step, feature, object, benefit, advantage, or the equivalent is recited in the claims.

While this disclosure describes exemplary embodiments of the invention, it should be noted that various changes and modifications could be made herein without departing from the scope of the invention as defined by the appended claims.

What is claimed is:

1. A method for communicating Internet data implemented by a carrier portal comprising a computing device, comprising:
    receiving the Internet data comprising an over-the-top (OTT) data traffic flood;
    classifying the Internet data based on criteria, wherein the criteria is based on at least one of i) a quantity of payment from at least one of a) a user of the Internet data and b) a provider of the Internet data and ii) another criteria specified by a carrier; and
    transmitting the classified data via one of a plurality of ports based on the classification, wherein each of the ports in the plurality of ports is coupled to a respective one of a plurality of independent data transport networks,
    wherein the plurality of independent data transport networks are one of physically and logically separate from one another via pipes which are at least one of physical layer (layer 1), data link layer (layer 2), and network layer (layer 3) pipes,
    wherein a first network of the plurality independent data transport networks comprises equal levels of service and a second network of the plurality of independent data transport networks comprises different levels of service for premium services, and wherein, when the criteria is zero for the quantity of payment, the classified data is transmitted to the first network.

2. The method of claim 1, wherein at least one data transport network in the plurality of independent data transport networks is at least one of higher capacity and lower latency than at least one other transport network in the plurality of independent data transport networks.

3. The method of claim 1, wherein the one of the plurality of ports is coupled to a respective one of a plurality of optical fibers.

4. An apparatus comprising a carrier portal configured to communicate Internet data, comprising:
    circuitry configured to receive the Internet data comprising an over-the-top (OTT) data traffic flood;
    circuitry configured to classify the Internet data based on criteria, wherein the criteria is based at least one of i) a quantity of payment from at least one of a) a user of the Internet data and b) a provider of the Internet data and ii) another criteria specified by a carrier; and
    circuitry configured to transmit the classified data via one of a plurality of ports based on the classification, wherein each of the ports in the plurality of ports is coupled to a respective one of a plurality of independent data transport networks,
    wherein the plurality of independent data transport networks are one of physically and logically separate from one another via pipes which are at least one of physical layer (layer 1), data link layer (layer 2), and network layer (layer 3) pipes,
    wherein a first network of the plurality independent data transport networks comprises equal levels of service and a second network of the plurality of independent data transport networks comprises different levels of service for premium services, and wherein, when the criteria is zero for the quantity of payment, the classified data is transmitted to the first network.

5. The apparatus of claim 4, wherein at least one data transport network in the plurality of independent data transport networks is at least one of higher capacity and lower latency than at least one other transport network in the plurality of independent data transport networks.

6. The apparatus of claim 4, wherein the independent networks in the plurality of independent data transport networks are physically separate from each other, yet will most often be physically carried over the same optical fiber.

7. The apparatus of claim 4, wherein the one of the plurality of ports is coupled to a respective one of a plurality of optical streams.

8. The apparatus of claim 4, wherein at least a part of the circuitry configured to classify is integrated on a semiconductor die.

9. The apparatus of claim 4, further comprising at least one of an edge router, an optical switch, and a network element, with which at least a part of the circuitry configured to classify is integrated.

10. The apparatus of claim 4, wherein a first independent data network comprises a network with equal levels of service and a second independent data network comprises different levels of service for premium services, wherein the criteria comprises zero for the quantity of payment being transmitted to the first independent data network.

11. An apparatus configured to communicate Internet data, comprising:
    a processor and a storage medium comprising instructions which, when executed, cause the processor to configured to:
        receive the Internet data comprising an over-the-top (OTT) data traffic flood at a carrier portal;
        classify the Internet data based on criteria, wherein the criteria is based on at least one of i) a quantity of payment from at least one of a) a user of the Internet data and b) a provider of the Internet data and ii) another criteria specified by a carrier; and
        transmit the classified data via one of a plurality of ports based on the classification, wherein each of the ports in the plurality of ports is coupled to a respective one of a plurality of independent data transport networks; and a memory coupled to the processor,
    wherein the plurality of independent data transport networks are one of physically and logically separate from one another via pipes which are at least one of physical layer (layer 1), data link layer (layer 2), and network layer (layer 3) pipes,
    wherein a first network of the plurality independent data transport networks comprises equal levels of service and a second network of the plurality of independent data transport networks comprises different levels of service for premium services, and wherein, when the criteria is zero for the quantity of payment, the classified data is transmitted to the first network.

12. The apparatus of claim 11, wherein at least one data transport network in the plurality of independent data transport networks is at least one of higher capacity and lower latency than at least one other transport network in the plurality of independent data transport networks.

13. The apparatus of claim 11, wherein the one of the plurality of ports is coupled to a respective one of a plurality of optical fibers.

14. The apparatus of claim 11, wherein at least a part of the processor is integrated on a semiconductor die.

15. The apparatus of claim 11, further comprising at least one of an edge router, an optical switch, and a network element, with which at least a part of the processor is integrated.

16. The apparatus of claim 11, wherein a first independent data network comprises a network with equal levels of service and a second independent data network comprises different levels of service for premium services, wherein the criteria comprises zero for the quantity of payment being transmitted to the first independent data network.

17. A non-transitory computer-readable medium, comprising instructions stored thereon that, if executed by a processor, cause the processor to execute a method comprising:
    receiving the Internet data comprising an over-the-top (OTT) data traffic flood at a carrier portal;
    classifying the Internet data based on criteria, wherein the criteria is based on at least one of i) a quantity of payment from at least one of a) a user of the Internet data and b) a provider of the Internet data and ii) another criteria specified by a carrier; and
    transmitting the classified data via one of a plurality of ports based on the classification, wherein each of the ports in the plurality of ports is coupled to a respective one of a plurality of independent data transport networks,
    wherein the plurality of independent data transport networks are one of physically and logically separate from one another via pipes which are at least one of physical layer (layer 1), data link layer (layer 2), and network layer (layer 3) pipes,
    wherein a first network of the plurality independent data transport networks comprises equal levels of service and a second network of the plurality of independent data transport networks comprises different levels of service for premium services, and wherein, when the criteria is zero for the quantity of payment, the classified data is transmitted to the first network.

18. The non-transitory computer-readable medium of claim 17, wherein at least one data transport network in the plurality of independent data transport networks is at least one of higher capacity and lower latency than at least one other transport network in the plurality of independent data transport networks.

19. The non-transitory computer-readable medium of claim 17, wherein the one of the plurality of ports is coupled to a respective one of a plurality of optical streams.

20. The non-transitory computer-readable medium of claim 17, implemented on devices effecting a centralized control mechanism based on Software Defined Network architectures, wherein the one of the plurality of ports is coupled to a respective one of a plurality of optical streams.

* * * * *